G. ANDERSON.
PEAVEY.
APPLICATION FILED JULY 15, 1918.

1,290,039.

Patented Jan. 7, 1919.

Inventor.
G. Anderson
By C. A. Snow & Co.
Attorneys.

Witness
J. R. Fanlin

UNITED STATES PATENT OFFICE.

GUSTAF ANDERSON, OF SPOKANE, WASHINGTON, ASSIGNOR OF ONE-HALF TO SIMON P. SEABERG, OF SPOKANE, WASHINGTON.

PEAVEY.

1,290,039.     Specification of Letters Patent.     Patented Jan. 7, 1919.

Application filed July 15, 1918. Serial No. 244,983.

*To all whom it may concern:*

Be it known that I, GUSTAF ANDERSON, a subject of the King of Sweden, residing at Spokane, in the county of Spokane and State of Washington, have invented a new and useful Peavey, of which the following is a specification.

The device forming the subject matter of this application is a peavey, and one object of the invention is to provide a peavey including a socket comprising laterally separable parts, so that the handle may be fitted to conform to the socket.

Another object of the invention is to provide a peavey wherein the pivot member for the hook serves also to retain the handle in the socket.

A further object of the invention is to provide novel means whereby the end spike is held in the socket.

It is within the province of the disclosure to improve the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
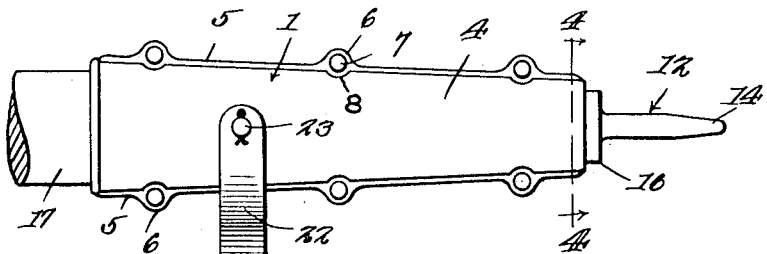
Figure 4:
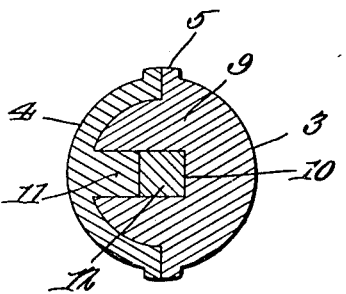
Figure 2:
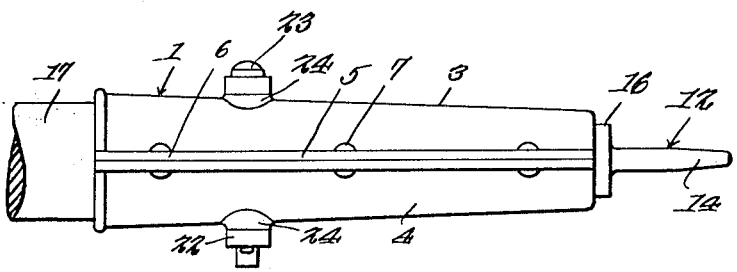
Figure 3:
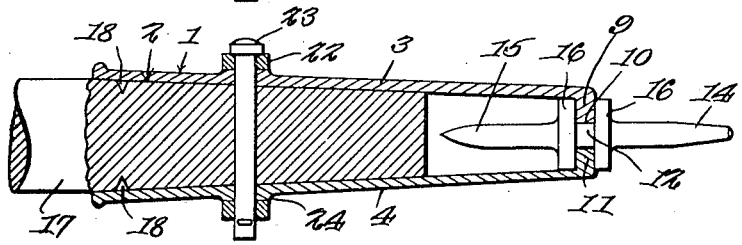

Figure 1 is a side elevation; Fig. 2 is a side elevation wherein the device is viewed at right angles to the showing of Fig. 1; Fig. 3 is a longitudinal section; Fig. 4 is a cross section on the line 4—4 of Fig. 1.

In carrying out the invention there is provided a socket 1 having a tapered bore 2, the socket including laterally separable parts 3 and 4 provided along their edges with flanges 5 carrying ears 6 through which securing devices 7 may be extended, to hold the parts 3 and 4 together, the said parts having recesses 8 adapted to receive the securing devices.

The part 3 of the socket is provided with an end wall 9, fitting closely in the part 4, the part 4 having a lug 11, received in a notch 10 in the wall 9, and constituting a closure for the mouth of the notch. The numeral 12 designates a reversible spike having ends 14 and 15. The spike 12 is supplied with spaced heads 16. The central portion of the spike 12 is received in the notch 10 of the end wall 9 and is held therein by the lug 11, the heads 16 lying on opposite sides of the end wall 9 and the lug 11, and coöperating therewith to prevent the spike from moving endwise. Obviously, by separating the parts 3 and 4 of the socket, the spike 12 can be turned end for end. A handle 17 fits in the socket 1 and is retained therein by prongs 18 carried by the parts 3 and 4 of the socket. The numeral 19 denotes a hook comprising a curved shank 20, a conical bill 21 at one end of the shank, and a fork 22 at the other end of the shank. The fork 22 spans the parts 3 and 4 of the socket and aids in holding them together, the parts of the socket having lugs 24 which coact with the fork 22 to prevent the hook 19 from having undue side play. A pivot element 23 passes through the lugs 24 and engages the ends of the fork 22 to hold the hook 19 on the socket 1 for swinging movement. It is to be observed that the pivot element 23 passes through the handle 17 and serves as a retaining means for the handle. The advantages of the structure are, among others, are that the end spike 12, although reversible, cannot slip out of the socket endwise, or have endwise movement in the socket: that the hook 19 does not have undue side play: that the pivot element 23 serves not only as a mounting for the hook 9, but serves, as well, as a retaining means for the handle 17; that the handle 17 may be shaped to the socket; and that the fork 22 of the hook 19, in combination with the pivot element 23, aids in holding the parts 3 and 4 of the socket together.

Having thus described the invention, what is claimed is:—

1. A peavey including a socket comprising laterally separable parts; a hook having a fork spanning said parts; and a pivot element uniting the fork and said parts.

2. A peavey constructed as set forth in claim 2 and further characterized by a handle in the socket and held therein by a pivot element.

3. A peavey including a handle; a reversible double-ended spike independent of the handle; a socket comprising trough-like parts engaging both the handle and the spike, the socket parts being laterally separable to release either the spike or the handle, the spike and said parts having interlocking elements retaining the spike against longitudinal movement; and means for connecting the socket parts.

In testimony that I claim the foregoing as my own, I have hereto affixed my signature in the presence of two witnesses.

GUSTAF ANDERSON.

Witnesses:
G. W. SOMMER,
L. E. KENNEDY.